Oct. 8, 1935.  E. A. WALES  2,016,305
TORQUE TRANSMITTING MECHANISM
Filed June 11, 1931  3 Sheets-Sheet 1
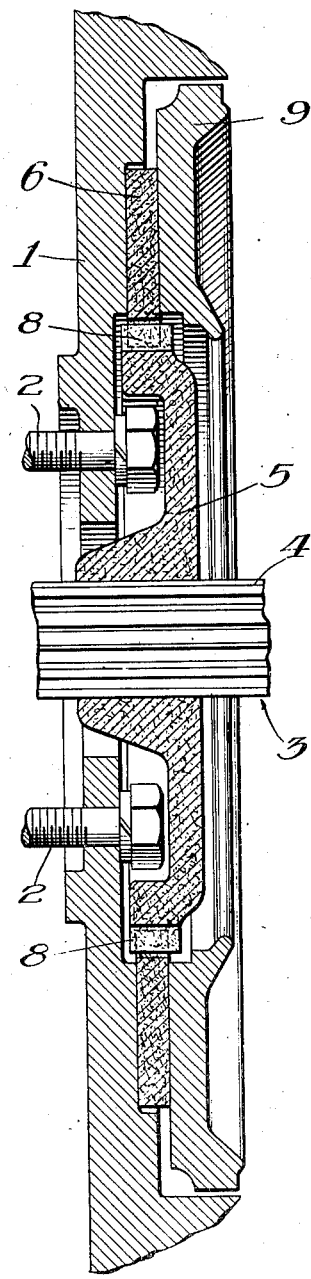
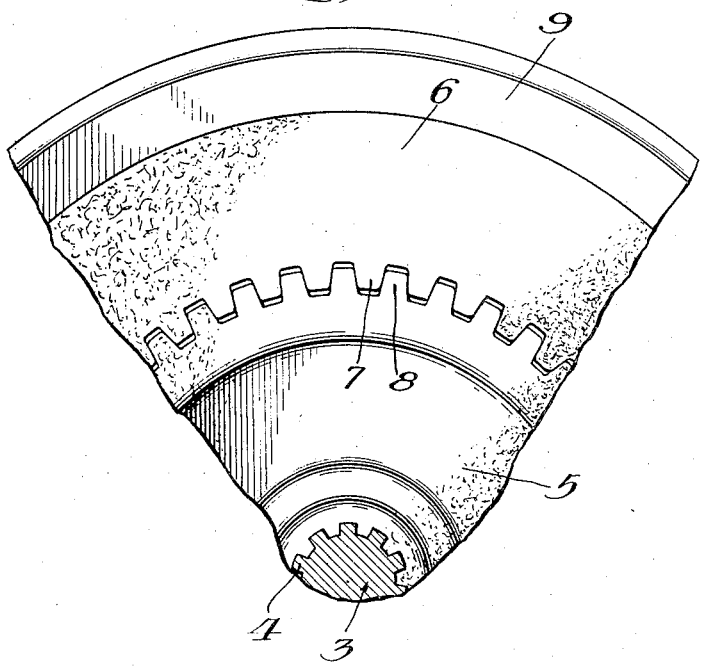
Inventor:
Earl A. Wales,
By Frank L. Belknap
Atty.

Oct. 8, 1935.  E. A. WALES  2,016,305
TORQUE TRANSMITTING MECHANISM
Filed June 11, 1931  3 Sheets-Sheet 2

Inventor:
Earl A. Wales
By Lee J. Gary
Attorney.

Oct. 8, 1935.  E. A. WALES  2,016,305

TORQUE TRANSMITTING MECHANISM

Filed June 11, 1931  3 Sheets-Sheet 3

Inventor:
Earl A. Wales,
By Frank L. Belknap
Atty.

Patented Oct. 8, 1935

2,016,305

UNITED STATES PATENT OFFICE 2,016,305

TORQUE TRANSMITTING MECHANISM

Earl A. Wales, Cleveland, Ohio, assignor to Raybestos-Manhattan, Inc., Bridgeport, Conn., a corporation of New Jersey Application June 11, 1931, Serial No. 543,500

2 Claims. (Cl. 192—68)

This invention relates to an improved torque transmitting mechanism particularly adapted for use in automobile clutches. More particularly, the invention provides an economical shock absorbing and noise reducing clutch mechanism with means for distributing and reducing local stresses.

One of the most serious objections to the type of clutch plate heretofore used is, that severe stress is placed on the steel splines of the hub and of the splined driven shaft in transmitting the motor torque to the gear box. Also, the transmission of the torque takes place with metal to metal contact at the splined shaft and splined clutch hub and through steel or other metal spiders or plates from or to the friction members. This construction is relatively stiff, unyielding, noise producing and non-shock absorbing.

Various means have been proposed for providing shock absorbing characteristics through the medium of intermediate springs, rubber plates and the like between the hub and plate member carrying the friction element, but all of these introduced complications and structural weakness at the intermediate joint with a tendency to loosen at this point producing misalignment and occasionally complete failure of the joint. Furthermore, the splined construction of the drive shaft and of the clutch plate hub necessitated by the considerable forces between the interlocking splines is relatively expensive both in the high quality of steel that must be used and the manufacturing cost of splining hubs and shafts in the high quality steel required. Another difficulty in the present type of clutch plate is the serious one of producing perfect alignment between the friction surfaces of the driving and driven members which is essential for smooth clutch action. It will readily be seen that a slight error in the right angle necessary between splines and the friction surfaces will produce misalignment and undue wear on the splined member as well as uneven clutch engagement.

Also with the metallic clutch plates heretofore used a large portion of the heat of friction is transmitted through the clutch plate to the spline shaft and thence to the clutch bearing which has therefore presented a serious lubrication problem in that it has been difficult to retain lubricant therein.

One of the features of my invention is directed to the provision of a clutch plate having a torque arm which has been increased in length from the radius of the splined steel shaft to a radius of a comparatively large non-metallic gear thereby reducing stress in inverse proportion to the comparative radii. Also the area of the surface upon which the stress is applied is much larger, being proportional to the increase in radius.

The use of a non-metallic driving member reduces noise of engagement and dampens torsional crank shaft vibration. It also reduces the transmission of heat to the clutch shaft and bearing, being a relatively poor conductor of heat.

Another advantage is the reduction of spinning weight of the non-metallic member over the present metal plate and hub construction. This has been one of the serious difficulties in the use of large diameter steel hubs. Furthermore, I use the many advantages inherent in the gear tooth clutch facing described in U. S. Patent 1,536,588 to Judd, such as quietness of engagement and increase in tooth contact area.

Other and further objects and advantages of my invention will be apparent from the accompanying drawings and following detail description.

In the drawings, Fig. 1 is a vertical, sectional view of one form of a torque transmitting mechanism utilizing the principles of my invention.

Fig. 2 is a face view of the clutch plate and friction member.

Figure 3:
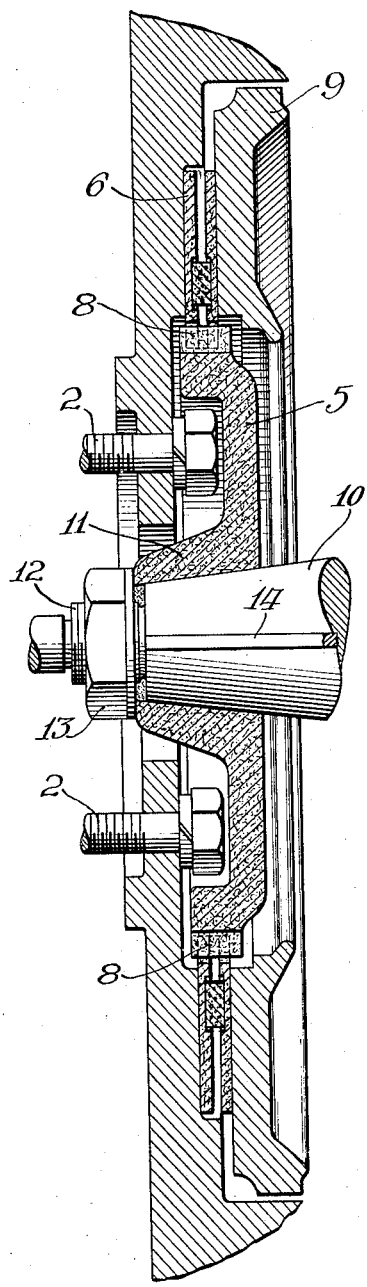
Fig. 3 is a vertical sectional view of a slight modification of my invention.

Referring in detail to the drawings, 1 indicates a flywheel which may be mounted in any suitable manner, for instance, by means of bolts 2 upon the rear end of a crank shaft not shown, for instance the crank shaft of an automobile. A shaft 3 may be disposed coaxially with respect to the flywheel 1 and may be provided with a splined periphery 4. A clutch plate 5 may be mounted upon the clutch shaft 3 and may be provided with an aperture, the defining surfaces of which may be splined to register with the splines 4 upon the shaft 3. A friction element 6 of annular shape may be positioned adjacent the outer periphery of plate 5 and may be provided with internal gear teeth 7 which may engage with cooperating gear teeth 8 provided upon the outer periphery of the plate 5. A clutch ring 9 may be disposed adjacent the outer periphery of the plate 5 and is adapted to maintain the friction element 6 in contact with the face of the flywheel 1 when the clutch is in an engaged position.

The clutch plate 5 may be constructed of a non-metallic material which may have sufficient structural strength for the duty involved, for instance, the same may be constructed of a material comprising a filler of asbestos, linen, canvas, paper or the like saturated and/or treated with a suitable binder.

The material comprising the friction element 6 may take the form of a molded or woven suitably impregnated material having a relatively high coefficient of friction, in other words, the material comprising the member 6 may take the form of the usual clutch facing material.

In utilizing my invention, the clutch plate 5 may be immovably mounted upon the clutch shaft 3. As is well known to any one skilled in the art, the clutch shaft 3 connects into the transmission gear box. In an automobile, for instance, depression of the clutch pedal may shift the ring 9 outwardly from the flywheel against the action of the clutch spring, not shown. When this operation takes place, the crank shaft of the engine and the clutch shaft 3 are disengaged. By releasing the clutch pedal the clutch spring impels the ring 9 inwardly toward the face of the flywheel 1 and presses the element 6 into contact with the face of the flywheel. In this manner, flywheel 1, element 6 and ring 9 rotate as a unit and inasmuch as the element 6 is positively coupled to the clutch plate 5, said motion will be imparted to the clutch shaft 3. It will be noted that by preventing relative motion between the clutch shaft 3 and the member 5 all of the motion of the clutch facing incident to release and engagement of the clutch takes place on the gear teeth 8 in the outer periphery of the plate 5 thereby increasing the area on which the force of the torque is applied because of the greater number of teeth subjected to engagement. This results in a reduction of wear and also inasmuch as the operative contact takes place between non-metallic materials an elimination of noise is accomplished.

In effect the non-metallic plate 5 and clutch shaft 3 takes the place of the splined shaft heretofore used and the clutch facing 6 with internal gear teeth 7 takes the place of the entire clutch plate member of present day construction. The simplicity of this construction as against the complicated clutch plates heretofore used is obvious to any one skilled in the art.

If desired, the plate 5 instead of being provided with splines registering with splines 4 provided upon the clutch shaft 3 may take the form shown best in Fig. 3 wherein 10 indicates the clutch shaft which may be tapered, the hub of the plate 5 shown at 11 may also be tapered to register with the taper of the shaft 10. The end of the shaft 10 may be threaded as shown best at 12 and a nut 13 may be adapted to tightly wedge the hub 11 upon the tapered end of the shaft 10. To prevent relative motion between the hub 11 and shaft 10 a key 14 may be provided in said shaft which may cooperate with suitable keyways. The remaining construction may be similar to that shown in Fig. 1, the corresponding parts being indicated by like reference numerals. This construction is exceedingly simple and eliminates the time and expense incident to splining the shaft and hub of the clutch plate.

Figure 4:
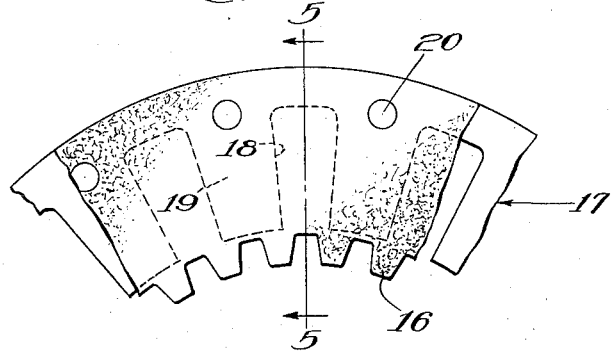
Fig. 4 is a fragmentary face view of a slightly modified form of friction element which may be utilized in conjunction with my invention.
Figure 5:
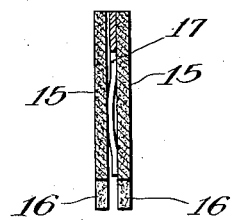
Fig. 5 is a sectional view taken on the line 5—5 of Fig. 4.

If desired, the friction element utilized in conjunction with my invention may be constructed in a plurality of portions having a resilient member interposed therebetween. Referring particularly to Figures 4 and 5, 15 indicates annular friction elements provided with internal teeth 16; a metallic element 17 may be positioned between the elements 15 and may be so constructed as to provide a degree of resiliency upon compression of the members 15 toward each other. The member 17 may be annular in shape and may be provided with slots 18 interspaced with respect to crimped, salient members 19. If desired, the entire assembly comprising the plates 15 and 17 may be fastened together by means of rivets or the like 20, or if found desirable the resilient element 17 may be loosely disposed between the members 15.

Figure 6:
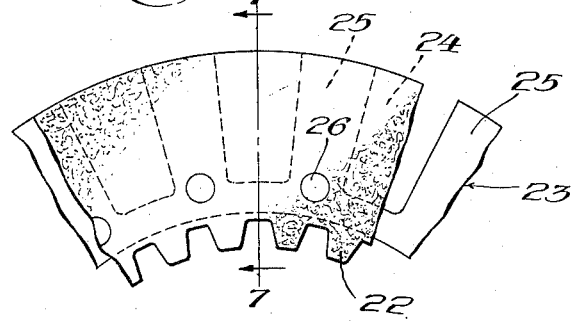
Fig. 6 is a fragmentary face view of a further modified form of friction element.
Figure 7:
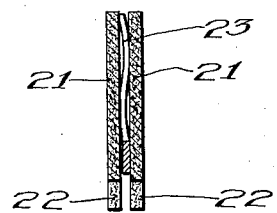
Fig. 7 is a sectional view taken on the line 7—7 of Fig. 6.
Figure 8:
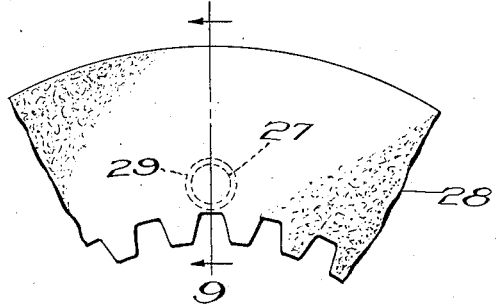
Fig. 8 is a fragmentary face view of another modified form of friction element.
Figure 9:
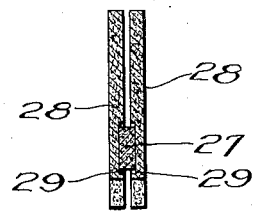
Fig. 9 is a sectional view taken on the line 9—9 of Fig. 8.

Referring particularly to Figs. 6 and 7, a slightly modified form of multiple construction of friction elements is shown wherein 21 indicates annular friction elements provided with internal teeth 22 and 23 indicates a resilient member which may be interposed between the friction elements 21. The member 23 may be provided with a plurality of slots 24 interspersed between salient members 25, the slots in this embodiment opening to the outer periphery of the annular resilient element 23. If desired, the entire assembly comprising the friction elements 21 and resilient element 23 may be fastened together by means of rivets or the like 26. In this embodiment the salient portions 25 may be crimped in order to provide a degree of resiliency upon compression of the friction members 21 toward each other.

Instead of utilizing a metallic resilient member between the two friction elements a plurality of cork, rubber composition or rubber blocks 27 may be positioned between friction elements 28, said elements being provided with recesses 29 upon their inner faces into which said blocks may be positioned. The use of such non-metallic resilient material between the friction members 28 may prove satisfactory when the frictional heat developed in the clutch is not too great to cause rapid decomposition of the resilient material.

In utilizing resilient elements such as 17, 23 and 27 between adjacent friction members, the amount of resiliency provided by the crimping of the metallic members 17 and 23 and the compressing of the blocks 27 is preferably not over $\frac{1}{16}$ of an inch and is usually in the vicinity of approximately $\frac{1}{32}$ of an inch. This construction gives an improvement in clutch action due to the fact that when the clutch spring load is applied the action of the intermediate resilient member above described takes up a portion of the spring load slowly and thus increases the slipping period and therefor smoothness of the clutch action.

The resiliency of the members 17, 23 and 27 is preferably such that the elements 15, 21 and 28 respectively may come into substantial contact with each other at considerably less than the full load of the clutch spring. In other words, the resilient member may preferably be completely closed at less than 50% of the full clutch spring pressure.

It is apparent that herein is provided a torque transmitting mechanism which, due to its construction, reduces local wear and uniformly distributes stresses incident to engagement over a greater area of material which in turn permits the use of a material (non-metallic or reinforced non-metallic) having more desirable properties for mechanical transmission purposes such as noiselessness and flexibility.

I claim as my invention:

1. In combination, a torque transmitting device comprising a driving member, a driven member including a shaft, a non-metallic clutch plate, rigidly mounted upon said shaft and having non-metal to metal contact with said shaft, a non-metallic friction element having splined engagement with said non-metallic clutch plate, said friction element comprising a plurality of annular friction members and a resilient member interposed between said friction members, and means for engaging said friction element and said driving member, whereby motion is transmitted through the non-metal to non-metal contact of said friction element and said clutch plate.

2. In combination, a torque transmitting device comprising a driving member, a driven member including a shaft, a non-metallic clutch plate rigidly mounted upon said shaft and having non-metal to metal contact with said shaft, a non-metallic friction element having splined engagement with said non-metallic clutch plate, and means for engaging said friction element and said driving member, whereby motion is transmitted through the non-metal to non-metal contact of said friction element and said clutch plate.

EARL A. WALES.